(12) United States Patent
Ishiwaki et al.

(10) Patent No.: US 7,790,053 B2
(45) Date of Patent: Sep. 7, 2010

(54) LOSS-LOSS MN-ZN FERRITE AND ELECTRONIC PART MADE THEREOF AND SWITCHING POWER SUPPLY

(75) Inventors: Masao Ishiwaki, Tottori (JP); Katsuyuki Shiroguchi, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 611 days.

(21) Appl. No.: 11/718,792

(22) PCT Filed: Nov. 21, 2005

(86) PCT No.: PCT/JP2005/021385

§ 371 (c)(1),
(2), (4) Date: May 7, 2007

(87) PCT Pub. No.: WO2006/054749

PCT Pub. Date: May 26, 2006

(65) Prior Publication Data

US 2008/0007377 A1 Jan. 10, 2008

(30) Foreign Application Priority Data

Nov. 19, 2004 (JP) ............................. 2004-335530

(51) Int. Cl.
*H01F 1/34* (2006.01)
(52) U.S. Cl. .................................................. 252/62.62
(58) Field of Classification Search ................ 252/62.62
See application file for complete search history.

(56) References Cited

U.S. PATENT DOCUMENTS

2004/0090302 A1* 5/2004 Sezai et al. .................. 336/233

FOREIGN PATENT DOCUMENTS

| EP | 1 083 158 A2 | 3/2001 |
|---|---|---|
| JP | 06-290925 | 10/1994 |
| JP | 06-310320 | 11/1994 |
| JP | 2001-080952 | 3/2001 |
| JP | 2004-292303 | 10/2004 |

OTHER PUBLICATIONS

"Nobuya Matsutani, et al."; Super Low Loss Ferrities; pp. 75-78.
Y. Matsuo, et al., Decreasing Core Loss of Mn—Zn Ferrite, Journal of the Magnetic Society of Japan, vol. 20, pp. 429-432 (1996).
T. Minakawa et al., Power Loss of MnZn Ferrite Containing $SnO_2$, Journal of the Magnetic Society of Japan, vol. 20, pp. 497-500(1996).

* cited by examiner

*Primary Examiner*—C. Melissa Koslow
(74) *Attorney, Agent, or Firm*—Sughrue Mion, PLLC

(57) ABSTRACT

A low-loss Mn—Zn ferrite comprising Fe, Mn and Zn as main components, Co, Ca and Si as first sub-components, and at least one Va-group metal as a second sub-component: Fe and Zn being 53-56% by mol (calculated as $Fe_2O_3$) and 1-9% by mol (calculated as ZnO), respectively, and Mn being the balance, based on the total amount (100% by mol) of the main components; Co and Ca being 500-5000 ppm (calculated as $Co_3O_4$) and 3000 ppm or less (calculated as $CaCO_3$), respectively, by mass based on the total amount of the main components, a mass ratio of Ca (calculated as $CaCO_3$) to Si (calculated as $SiO_2$) being 2 or more; Ta being 250 ppm or more (calculated as $Ta_2O_5$) among the Va-group metals; the ferrite having an average crystal grain size of less than 3.2 μm and volume resistivity ρ of 1 Ω·m or more, and a power loss Pcv of 350 kW/m³ or less in a range of 0° C.-120° C. at a frequency of 2 MHz and a magnetic flux density of 25 mT.

11 Claims, 2 Drawing Sheets

LOSS-LOSS MN-ZN FERRITE AND ELECTRONIC PART MADE THEREOF AND SWITCHING POWER SUPPLY

FIELD OF THE INVENTION

The present invention relates to Mn—Zn ferrite used for electronic parts such as transformers, choke coils, etc. in switching power supplies, etc., particularly to Mn—Zn ferrite having low power loss (core loss) with little temperature dependency at high frequencies of 1 MHz or more, an electronic part made of such Mn—Zn ferrite, and a switching power supply comprising such electronic part.

BACKGROUND OF THE INVENTION

As electronic equipment has recently been being made smaller and lighter in weight, and as mobile gear has been finding wider use, switching power supplies have been being made smaller with higher performance. The switching power supplies are used in various circuits needing power supply. In personal computers (PCs), for instance, DC-DC converters are mounted near digital signal processors (DSP), microprocessing units (MPU), etc. As the operation voltage of large-scale integrated circuits (LSI) constituting DSP and MPU becomes lower, measures are taken to lower the output voltage of DC-DC converters and increasing electric current thereof. Because lowering the operation voltage makes the operation of LSI unstable to the variations (ripple) of the output voltage, measures are focused on increasing the switching frequencies of the DC-DC converters.

Switching power supply circuits comprise inductance elements such as transformers, choke coils, etc. Increase in the switching frequencies results in decrease in the number of winding of a coil on a ferrite core constituting an inductance element, preferable from the aspect of the miniaturization of switching power supply circuits and the reduction of copper loss. For such purpose, too, further increase in the switching frequencies is expected.

Because the switching power supply circuits are used in various environments such as electric cars (EVs), hybrid electric cars (HEVs), mobile communications equipment such as cell phones, etc., they are subject to various ambient temperatures and loads. The switching power supply circuits may be put at temperatures near 100° C. not only by their own heat, but also by heat generated by surrounding circuits or ambient temperatures. Because such switching power supply circuits are used at high frequencies in various environments, ferrite cores therein are demanded to have low power loss at a high frequency in a wide temperature range and a wide operating magnetic flux density range. Namely, it is required that they are not magnetically saturated without subject to high electric current.

The power loss of ferrite includes eddy current loss, hysteresis loss and residual loss. The eddy current loss is caused by electromotive power of eddy current generated by electromagnetic induction, increasing in proportion to the square of frequency. The hysteresis loss is caused by DC hysteresis, increasing in proportion to the frequency. The residual loss is the rest of the loss caused by domain wall resonance, spontaneous resonance, diffusion resonance, etc. It is well known that the power loss varies in a secondary-curve manner relative to the temperature, usually minimum at a point that the crystal magnetic anisotropy constant $K_1$ is 0. The temperature at which $K_1$ is 0 is a temperature at which the initial permeability $\mu i$ is the maximum. Thus, it is called the secondary peak of the initial permeability $\mu i$.

The Mn—Zn ferrite cores having high saturation magnetic flux densities are used for switching power supply circuits such that they have low power loss in various environments. However, the Mn—Zn ferrite containing more than 50% by mol of $Fe_2O_3$ has extremely smaller volume resistivity because of the existence of $Fe^{2+}$ in the spinel than that of Ni—Zn ferrite, so that it has larger power loss due to eddy current loss as the switching frequency becomes higher. Accordingly, the switching power supply circuit comprising the Mn—Zn ferrite exhibits efficiency decreasing as the frequency increases.

To reduce the power loss of ferrite, various methods have been proposed so far. To reduce the power loss at high frequencies, it is effective, for instance, to reduce the crystal grain size of ferrite, and to form an insulating grain boundary phase containing high-resistance Si and Ca. As such methods, Matsuo et al., "Loss Reduction of Mn—Zn ferrite," The Journal of The Magnetics Society of Japan, Vol. 20, No. 2, 1996, pp. 429-432 propose to increase the concentration of Ca in grain boundaries by the addition of alkali metal chlorides to provide them with high AC resistivity, thereby reducing the power loss at high frequencies.

Minagawa et al., "Power Loss of Mn—Zn Ferrite Containing $SnO_2$," The Journal of The Magnetics Society of Japan, Vol. 20, No. 2, 1996, pp. 497-500, propose to suppress the movement of electrons between $Fe^{2+}$ and $Fe^{3+}$ by substituting part of Fe with Sn to increase resistance in the crystal grains, thereby reducing the eddy current loss.

Matsuya et al., "Ultra-Low-Loss Ferrite Materials," Power and Powder Metallurgy, Vol. 41, No. 1, propose that because the power loss at a frequency exceeding 500 kHz is predominantly residual loss, the residual loss is reduced by preventing domain wall resonance, which is achieved by making the crystal grain structure finer (as small as 3-5 µm) to reduce domain walls.

JP 08-001844B proposes the addition of Co having a positive crystal magnetic anisotropy constant to reduce the temperature dependency of power loss, and Si, Ca and Ta to reduce the eddy current loss, thereby providing the Mn—Zn ferrite with low power loss at as high a frequency as 500 kHz or more in a wide temperature range of 20° C.-120° C.

The power loss of Mn—Zn ferrite has been reduced to some extent by various proposals as described above. Because the efficiency of the switching power supply is largely affected by the power loss of a ferrite core, it is necessary to further reduce the power loss of the ferrite core to provide the switching power supply with higher efficiency. Now that the switching frequency of the switching power supply has increased to 1-2 MHz, and is further proposed to as high as about 4 MHz, demand is mounting on Mn—Zn ferrite having low loss even in such a high switching frequency in a wide temperature range, as well as a high saturation magnetic flux density. However, the above conventional Mn—Zn ferrites fail to meet such demand.

OBJECTS OF THE INVENTION

Accordingly, an object of the present invention is to provide a low-loss Mn—Zn ferrite having a low power loss and a high saturation magnetic flux density at as high a frequency as 1 MHz or more, particularly 2 MHz or more, in a wide temperature range and a wide operation magnetic flux density.

Another object of the present invention is to provide an electronic part such as a transformer, a choke coil, etc. using such low-loss Mn—Zn ferrite.

A further object of the present invention is to provide a switching power supply comprising such an electronic part.

DISCLOSURE OF THE INVENTION

The low-loss Mn—Zn ferrite of the present invention comprises Fe, Mn and Zn as main components, Co, Ca and Si as first sub-components, and at least one Va-group metal as a second sub-component; Fe being 53-56% by mol (calculated as $Fe_2O_3$), Zn being 1-9% by mol (calculated as ZnO), and Ma being the balance, based on the total amount (100% by mol) of the main components; Co and Ca being 500-5000 ppm (calculated as $Co_3O_4$) and 3000 ppm or less (calculated as $CaCO_3$), respectively, by mass based on the total amount of the main components, a mass ratio of Ca (calculated as $CaCO_3$) to Si (calculated as $SiO_2$) being 2 or more; Ta being 250 ppm or more (calculated as $Ta_2O_5$) among the Va-group metals; the ferrite having an average crystal-grain size of less than 3.2 μm and volume resistivity ρ of 1 Ω·m or more, and a power loss Pcv of 350 kW/m³ or less in a range of 0° C.-120° C. at a frequency of 2 MHz and a magnetic flux density of 25 mT.

The Va-group metal is preferably at least one selected from the group consisting of Ta, Nb and V, the total amount of the Va-group metals being 250-2000 ppm by mass (calculated as $Ta_2O_5$, $Nb_2O_5$ and $V_2O_5$) based on the total amount of the main components.

The low-loss Mn—Zn ferrite of the present invention preferably further comprises at least one selected from the group consisting of Zr, Hf. Sn and Ti as a third sub-component; Zr being 1500 ppm or less (calculated as $ZrO_2$), Hf being 1500 ppm or less (calculated as $HfO_2$), Sn being 10000 ppm or less (calculated as $SnO_2$), and Ti being 10000 ppm or less (calculated as $TiO_2$), by mass based on the total amount of the main components.

The low-loss Mn—Zn ferrite of the present invention preferably has an initial permeability μi of 400 or more at 100 kHz and 20° C., and a saturation magnetic flux density Bm of 400 mT or more at 100° C.

The low-loss Mn—Zn ferrite of the present invention preferably comprises main components comprising 54-55% by mol (calculated as $Fe_2O_3$) of Fe, and 1.5-7% by mol (calculated as ZnO) of Zn, the balance being Mn, Co, Ca and Ta being 1000-4000 ppm (calculated as $Co_3O_4$), 500-3000 ppm (calculated as $CaCO_3$) and 500-2000 ppm (calculated as $Ta_2O_5$), respectively, by mass based on the total amount of the main components, thereby having a power loss Pcv of 1500 kW/m³ or less in a range of 20° C.-120° C. at a frequency of 2 MHz and a magnetic flux density of 50 mT.

It is preferable that Si and Ca are 40 ppm or more (calculated as $SiO_2$) and 500-3000 ppm (calculated as $CaCO_3$), respectively, the total amount of $SiO_2$ and $CaCO_3$ being 750 ppm or more based on the total amount of the main components by mass.

The low-loss Mn—Zn ferrite of the present invention preferably has grain boundary layers containing Si and Ca, and flirter an oxide of at least one Va-group metal. Ca and at least one of Zr, Hf, Sn and Ti are preferably dissolved in the crystal grains.

The Mn—Zn ferrite of the present invention preferably has an average crystal grain size of 1.0-3.0 μm. To achieve low loss at a high operation magnetic flux density (50 mT), the average crystal grain size is further preferably 1.2-3.0 μm.

The electronic part of the present invention comprises a magnetic core made of the above low-loss Mn—Zn ferrite, around which the coil is wound.

The switching power supply of the present invention comprises the above electronic part as a transformer and/or a choke coil.

DESCRIPTION OF THE BEST MODE OF THE INVENTION

Figure 1:
FIG. 1 is a TEM photograph showing the crystal structure of the Mn—Zn ferrite according to one embodiment of the present invention.

[1] Composition and Properties of Mn—Zn Ferrite

The power loss Pcv is generally represented by the following formula (1):

$$Pcv = Ph + Pe + Pr \\ = Kh \times Bm^3 \times f + (Ke \times Bm^2 \times f^2 \times d^2)/\rho + Pr, \qquad (1)$$

wherein Ph is a hysteresis loss, Pe is an eddy current loss, Pr is a residual loss, Bm is a measured magnetic flux density, f is a measured frequency, ρ is a volume resistivity, d is an eddy current radius [approximating to (crystal grain size)/2], and Kh and Ke are constants.

The hysteresis loss Ph is predominantly determined by the saturation magnetization and coercivity of the Mn—Zn ferrite, increasing in proportion to frequency. The eddy current loss Pe is proportional to the square of (crystal grain size)/2 and the square of frequency and inversely proportional to the volume resistivity. The residual loss Pr is remarkable at a frequency of 500 kHz or more.

The hysteresis loss Ph, the eddy current loss Pe and the residual loss Pr vary depending on the frequency used, and the ratio of each loss in the overall power loss differs depending on a frequency band. Accordingly, to achieve low power loss, it is necessary to reduce not only each loss but also the power loss depending on the frequency used. Intense research has revealed a composition and a fine structure providing a low power loss with a high saturation magnetic flux density at as high a frequency as 1 MHz or more, particularly 2 MHz or more, in a wide temperature range.

Turning to the crystal magnetic anisotropy constant $K_1$ of the Mn—Zn ferrite, it is known that a ferrite having such a composition that its crystal magnetic anisotropy constant $K_1$ and magnetostriction constant λs are 0 has a large initial permeability μi and a small power loss Pcv. It is thus necessary to properly adjust the amounts of metal ions having positive crystal magnetic anisotropy constants $K_1$ and metal ions having negative crystal magnetic anisotropy constants $K_1$ among those constituting the ferrite, to reduce the power loss Pcv at a large initial permeability μi. $Fe^{2+}$ is a metal ion having positive $K_1$, and $Fe^{3+}$, $Zn^{2+}$ and $Mn_{2+}$ are metal ions having negative $K_1$. The crystal magnetic anisotropy constants $K_1$ of these metal ions become gradually close to 0, when the temperature is elevated to a Curie temperature Tc.

The temperature at which the ferrite has the minimum power loss varies depending on the composition of metal ions in the ferrite. The composition of metal ions determines the total amount of the crystal magnetic anisotropy constants $K_1$ of metal ions, which in turn determines the magnetic anisotropy of the overall ferrite. With respect to the composition of metal ions, the amounts of $Fe^{2+}$ and other metal ions change depending on the amounts of $Fe_2O_3$, ZnO, etc.

Ferrite for electronic parts such as choke coils, transformers, etc. usually has such a composition that its crystal magnetic anisotropy constant $K_1$ in the used temperature range is lower than 0 on the low-temperature side, increases as the temperature is elevated, and higher than 0 on the high-temperature side, and that it has a temperature at which $K_1=0$ (temperature at which its power loss is minimum) until reaching its Curie temperature Tc.

Although it is easy to change the temperature at which the crystal magnetic anisotropy constant $K_1$ is 0 by adjusting the ferrite composition, the degree of freedom of selecting the composition is actually small because demand for magnetic properties such as saturated magnetic flux density, Curie temperature, initial permeability, etc. should be met. Particularly increase in $Fe^{2+}$ undesirably leads to decrease in the volume resistivity ρ of the ferrite, resulting in increase in eddy current loss.

Although the adjustment of the composition of metal ions such as $Fe^{2+}$, $Fe^{3+}$, $Zn^{2+}$ and $Mn^{2+}$ can change the temperature at which the power loss Pcv is minimum, it is difficult to improve the temperature dependency of the power loss Pcv, by which the power loss Pcv increases or decreases depending on the temperature.

In view of the above situations, the Mn—Zn ferrite of the present invention contains $Co^{2+}$ as a metal ion having a positive crystal magnetic anisotropy constant $K_1$, in addition to metal ions such as $Fe^{2+}$, $Fe^{3+}$, $Zn^{2+}$ and $Mn^{2+}$, to adjust the temperature at which the power loss is minimum, thereby improving the temperature dependency of the power loss. Because $Co^{2+}$ has larger crystal magnetic anisotropy constant and magnetostriction constant than those of other metal ions, the amount of $Fe_2O_3$ need only be reduced depending on the amount of Co added to improve the temperature dependency of power loss without changing the temperature at which the power loss is minimized. Decrease in the amount of $Fe_2O_3$ leads to decrease in the amount of $Fe^{2+}$, desirably resulting in increase in the volume resistivity ρ and thus decrease in eddy current loss. If too much Co were added, however, the ferrite would likely have too large a magnetic anisotropy constant on the positive side at low temperatures, resulting in drastic increase in power loss.

Based on the above finding, the composition of the Mn—Zn ferrite of the present invention has been controlled such that with the total amount of Fe, Mn and Zn as main components 100% by mol (calculated as $Fe_2O_3$, $Mn_3O_4$ and ZnO), Fe is 53-56% by mol, and Zn is 1-9% by mol, the balance being Mn; that Co is 500-5000 ppm by mass (calculated as $Co_3O_4$), and Ca is 3000 ppm or less by mass (calculated as $CaCO_3$), a mass ratio of Ca to Si being 2 or more (calculated as $CaCO_3$ and $SiO_2$), based on the total amount of the main components; and that among the Va-group metals, Ta is 250 ppm or more (calculated as $Ta_2O_5$). This composition provides a reduced crystal magnetic anisotropy constant $K_1$ with improved temperature dependency. Specifically, the power loss Pcv has been controlled to 350 kW/m³ or less at a frequency of 2 MHz and a magnetic flux density of 25 mT in a range of 20° C.-120° C. In addition, the ferrite preferably has an average crystal grain size of less than 3.2 μm, particularly 1.2-3 μm, volume resistivity ρ of 1 Ω·m or more, initial permeability μi of 400 or more at 100 kHz and 20° C., a saturation magnetic flux density Bm of 400 mT or more at 100° C., and a Curie temperature Tc of 200° C. or higher.

To reduce the residual loss, of course, the resonance frequency of the initial permeability is set higher than the used frequency of a switching power supply. For instance, when the used frequency of a switching power supply is 2 MHz, the composition and permeability of the ferrite are selected so as to provide a resonance frequency of 4 MHz or more and a domain wall resonance frequency of 8 MHz or more.

The Mn—Zn ferrite of the present invention comprises first sub-components of Co, Ca and Si, in addition to the main components. Although Si and Ca are impurities contained in starting materials, the amounts of Si and Ca are adjusted to predetermined ranges in the Mn—Zn ferrite of the present invention, such that Si and Ca exist predominantly in grain boundaries in the sintered ferrite to insulate crystal grains, thereby increasing the volume resistivity ρ.

Si and Ca are added in a sintering step under proper conditions to increase the volume resistivity ρ of the ferrite, thereby reducing its relative loss coefficient tan δ/μi. Because Si and Ca tend to form low-melting-point composite oxides ($2FeO.SiO_2$, FeO.CaO, etc.) with iron oxide, the adjustment of their amounts makes it possible to prevent the densification of a sintered ferrite, enlarge crystal grain sizes and widen their distribution. On the other hand, as described below, their combination with Ta, etc. can prevent the formation of the low-melting-point composite oxides. Ca also contributes to preventing the evaporation of the low-melting-point metals during sintering.

As a result of intense research, it has been found that when 40 ppm or more (calculated as $SiO_2$) of Si and 3000 ppm or less (calculated as $CaCO_3$) of Ca are added, the total amount of $SiO_2$ and $CaCO_3$ being 750 ppm or more, and a mass ratio of $CaCO_3$ to $SiO_2$ being 2 or more, grain boundary layers with uniform thickness of several nanometers are formed around crystal grains, exhibiting the effects of combined Ca and Si.

Although it is difficult to observe the crystallinity of the crystal grain boundaries because they are extremely thin, the analysis by spot electron beam diffraction of grain boundary triple points on which three crystal grains converge confirms that an amorphous phase having large volume resistivity is formed at the grain boundary triple points in the sintered Mn—Zn ferrite with $CaCO_3/SiO_2$ of 2 or more, the total amount of $SiO_2$ and $CaCO_3$ being 750 ppm or more.

When the total amount of $SiO_2$ and $CaCO_3$ is less than 750 ppm, it is difficult to provide the Mn—Zn ferrite with low loss. When $SiO_2$ and $CaCO_3$ are more than the above ranges, abnormal sintering such as abnormal crystal grain growth, etc. is likely to occur, and when they are lower than the above ranges, it is difficult to obtain Mn—Zn ferrite with low loss.

When $CaCO_3/SiO_2$ is less than 2, the power loss Pcv is extremely large. Increase in the power loss Pcv is presumably caused by the reduction of volume resistivity ρ, which occurs by partial defects in the crystal grain boundary layers in which crystals of $SiO_2$, CaO or their compounds are formed.

Si is hardly dissolved in a spinel phase, but segregated predominantly in crystal grain boundaries and their triple points. Ca is also segregated predominantly in crystal grain boundaries and their triple points, but Ca is dissolved in a spinel phase during the sintering step, and partially remains in the crystal grains after sintering. As more Ca is dissolved in the spine phase, the amount of Ca inevitably decreases in the grain boundary layers, and becomes insufficient in some cases. On the other hand, the solid solution of Ca in the spinel phase leads to decrease in $Fe^{2+}$ in the spinel. With more Ca dissolved, $Fe^{2+}$ decreases in the crystal grains, resulting in higher resistance, which in turn increases the volume resistivity $\rho$.

Accordingly, to obtain Mn—Zn ferrite with high volume resistivity $\rho$ and low power loss, it is effective to cause Ca to be dissolved in the spinel phase to reduce $Fe^{2+}$, thereby increasing the resistance of the crystal grains, and to cause Ca to be segregated more in the crystal grain boundaries than in the spinel phase to form higher-resistance crystal grain boundaries. For this purpose, the mass ratio of Ca to Si should be 2 or more (calculated as $CaCO_3$ and $SiO_2$).

In order that the power loss Pcv at a frequency of 2 MHz and a magnetic flux density of 25 mT in a range of 0° C.-120° C. is 350 kW/m$^3$ or less, and that the power loss Pcv at a frequency of 2 MHz and a magnetic flux density of 50 mT in a range of 20° C.-120° C. is 1500 kW/m$^3$ or less, the following composition conditions are preferably met. With respect to the main components, Fe is preferably 54-55% by mol (calculated as $Fe_2O_3$), and Zn is preferably 1.5-7% by mol (calculated as ZnO). With respect to the first sub-components, Co is preferably 1000-5000 ppm, more preferably 2000-5000 ppm (calculated as $Co_3O_4$). Ca is preferably 500-3000 ppm, more preferably 600-2500 ppm (calculated as $CaCO_3$). Si is preferably 40-700 ppm, more preferably 50-600 ppm (calculated as $SiO_2$). The total amount of $SiO_2$ and $CaCO_3$ is preferably 1000 ppm or more, and $CaCO_3/SiO_2$ is preferably 10 or more.

The Mn—Zn ferrite of the present invention contains at least one Va-group metal as the second sub-component. The Va-group metal is at least one selected from the group consisting of Ta, Nb and V. The Va-group metal enters into the crystal grain boundary layers together with Si and Ca, thereby providing the grain boundary layers with higher resistance and thus lowering the power loss. Particularly Ta has a high melting point than those of Nb and V, preferably preventing the melting point of the ferrite from lowering by oxides of Ca, Si and Fe. The total amount of Ta, Nb and V by mass is preferably 250-2000 ppm, more preferably 500-2000 ppm (calculated as $Ta_2O_5$, $Nb_2O_5$ and $V_2O_5$). The total amount of Ta, Nb and V exceeding 2000 ppm is undesirably, because the power loss rather increases, and the initial permeability $\mu i$ decreases. When the total amount of Ta, Nb and V is less than 250 ppm, the reduction of power loss cannot effectively be achieved.

Because an oxide of Ta has a higher melting point than that of an oxide of Nb, it is effective to form the grain boundary layers. Ta and Nb suppress the crystal grain growth to provide a uniform crystal structure, effective to reduce the power loss. V improves the workability of the sintered body, effective to suppress chipping, etc. Because the V oxide has an extremely lower melting point than those of the Ta oxide and the Nb oxide, the V oxide has a function of accelerating the crystal grain growth. Thus, V is preferably 300 ppm or less (calculated as $V_2O_5$).

Ta is preferably 250 ppm or more, more preferably 500-2000 ppm (calculated as $Ta_2O_5$). Nb and V are preferably 300 ppm or less (calculated as $Nb_2O_5$ and $V_2O_5$).

The Mn—Zn ferrite of the present invention may further contain at least one selected from the group consisting of Zr, Hf, Sn and Ti as a third sub-component. Zr, Hf, Sn and Ti are turned to stable tetravalent metal ions in the ferrite, which are dissolved in the crystal grains together with Ca to increase the volume resistivity and reduce the power loss Pcv. Also, the addition of at least one of Zr, Hf, Sn and Ti changes $Mn^{3+}$ to $Mn^{2+}$ in the spinel, improving the initial permeability $\mu i$. Although at least one of Zr, Hf, Sn and Ti exists predominantly in the crystal grains, part of them may exist in the crystal grain boundaries.

The amounts of Zr, Hf, Sn and Ti by mass are preferably 1500 ppm or less, 1500 ppm or less, 10000 ppm or less and 10000 ppm or less (calculated as $ZrO_2$, $HfO_2$, $SnO_2$ and $TiO_2$), respectively, more preferably 1000 ppm or less, 1000 ppm or less, 5000 ppm or less and 5000 ppm or less, respectively. When the amount of each of Zr, Hf, Sn and Ti exceeds the above upper limit, abnormal grain growth is likely to occur, undesirably resulting in the increased power loss and the decreased saturation magnetic flux density.

Starting materials forming the ferrite contain impurities such as sulfur (S), chlorine (Cl), phosphorus (P), boron (B), etc. The reduction of the amounts of these impurities leads to decrease in the power loss and improvement in the permeability. Particularly compounds formed by S with Ca are likely to be segregated as foreign matter in the crystal grain boundaries, resulting in decreased volume resistivity $\rho$ and increased eddy current loss. Thus, to her reduce the power loss, it is preferable to reduce S to 300 ppm or less, Cl to 100 ppm or less, P to 10 ppm or less, and B to 1 ppm or less by mass.

When the average crystal grain size is made as small as less than 3.2 μm with a uniform crystal grain size in the Mn—Zn ferrite of the present invention, the eddy current loss is reduced, and the residual loss due to domain wall resonance is also reduced because smaller crystal grains lead to less domain walls. What is necessary to achieve the average crystal grain size of less than 3.2 μm in the sintered ferrite is to use the calcined ferrite powder having as small an average crystal grain size as less than 1 μm for sintering with the desired sub-component composition and conditions. Because smaller calcined ferrite powder can produce dense ferrite even at low sintering temperatures (for instance, 1200° C. or lower), the crystal grains are small and uniform in the resultant sintered ferrite.

The Mn—Zn ferrite according to a preferred embodiment of the present invention comprises main components comprising 54-55% by mol (calculated as $Fe_2O_3$) of Fe, and 1.5-7% by mol (calculated as ZnO) of Zn, the balance being Mn; and first sub-components comprising by mass 1000-4000 ppm (calculated as $Co_3O_4$) of Co, 500-3000 ppm (calculated as $CaCO_3$) of Ca, and 40-700 ppm (calculated as $SiO_2$) of Si, and second sub-components (500-2000 ppm in total) comprising 500-2000 ppm (calculated as $Ta_2O_5$) of Ta and 300 ppm or less (calculated as $V_2O_5$) of V, both based on the main components; and having power loss Pcv of 1500 kW/m$^3$ or less at a frequency of 2 MHz and a magnetic flux density of 50 mT in a range of 20° C.-120° C., meaning low loss even in a large operating magnetic field.

The Mn—Zn ferrite of the present invention having the above composition has volume resistivity $\rho$ of 1 Ω·m or more, preferably 2 Ω·m or more, initial permeability $\mu i$ of preferably 500 or more at 100 kHz and 20° C., and a saturation magnetic flux density Bm of preferably 400 mT or more at 100° C. Also, the power loss Pcv is preferably 300 kW/m$^3$ or less at a frequency of 2 MHz and a magnetic flux density of 25 mT in a range of 0° C.-120° C., and it is preferably 1200 kW/m$^3$ or less, more preferably 1000 kW/m$^3$ or less, at a frequency of 2 MHz and a magnetic flux density of 50 mT in a range of 20° C.-120° C.

[2] Production Method of Mn—Zn Ferrite $Fe_2O_3$, $Mn_3O_4$ and ZnO weighed to the predetermined amounts in advance are calcined, pulverized, properly mixed with $Co_3O_4$, $SiO_2$, $CaCO_3$ and other sub-components, granulated, molded, and then sintered. The sintering step comprises a step of elevating the temperature to a predetermined level, a step of keeping the predetermined temperature, and a step of lowering the temperature. The preferred sintering step comprises, for instance, elevating the temperature from room temperature to 900° C. in the air, substituting the air in the furnace with an inert gas such as $N_2$, etc. at 900° C., and elevating the temperature to 1150° C. In the step of keeping the temperature at 1150° C., an oxygen concentration in the inert gas is controlled to 0.2-2%, and the temperature is lowered at an equilibrium oxygen partial pressure or in an inert gas atmosphere. The higher the oxygen concentration is, the more Ca is segregated to the crystal grain boundaries, and Ca is dissolved in the spinel phase at temperatures higher than 1100° C. at low oxygen partial pressure or in an inert gas atmosphere. Accordingly, the oxygen partial pressure is controlled, for instance, to 0.2-2%, to segregate Ca in the grain boundaries, and to properly control Ca dissolved in the crystal grains. The concentration of oxygen in the inert gas in the temperature-keeping step is preferably 0.3-1.5%. It should be noted, however, that each of the above temperatures is a mere example, and that it does not restrict the scope of the present invention.

predetermined shape and sintered to obtain a toroidal core of 14 mm in outer diameter, 7 mm in inner diameter and 5 mm in thickness.

The sintering was conducted in the following two patterns. The sintering pattern A comprised temperature elevation from room temperature to 900° C. in the air, the substitution of the air in a sintering furnace by $N_2$ at 900° C., temperature elevation to 1150° C. in $N_2$, and keeping the temperature at 1150° C. for 4 hours with an oxygen concentration adjusted to 0.5% in an $N_2$ atmosphere, temperature decrease from 1150° C. to 900° C. at a cooling speed of 100° C./hr at an equilibrium oxygen partial pressure, and temperature decrease to lower than 900° C. at a cooling speed of 200° C./hr in an $N_2$ atmosphere in this order. The sintering pattern B was the same as the sintering pattern A except that the oxygen concentration was 0.1% in the $N_2$ atmosphere in the temperature-keeping step.

Table 1 shows the amounts of main components and sub-components and the sintering pattern in each Sample. Samples 1-4, 7, 9-11 are within the range of the present invention, while Samples 5, 6, 8 and 12-15 (with * after the number of Sample) are outside the range of the present invention.

TABLE 1

| Sample No. | Main Components (% by mol) | | | Sub-Components (ppm) | | | | $CaCO_3$/ $SiO_2$ | Sintering Pattern |
|---|---|---|---|---|---|---|---|---|---|
| | $Fe_2O_3$ | ZnO | $Mn_3O_4$ | $Co_3O_4$ | $CaCO_3$ | $SiO_2$ | $Ta_2O_5$ | | |
| 1 | 54.4 | 6.7 | bal. | 1930 | 1200 | 150 | 1000 | 8.0 | A |
| 2 | 54.4 | 6.7 | bal. | 1930 | 1200 | 300 | 1000 | 4.0 | A |
| 3 | 54.4 | 6.7 | bal. | 1930 | 1200 | 450 | 1000 | 2.7 | A |
| 4 | 54.4 | 6.7 | bal. | 1930 | 1200 | 600 | 1000 | 2.0 | A |
| 5* | 54.4 | 6.7 | bal. | 1930 | 1200 | 750 | 1000 | 1.6 | A |
| 6* | 54.4 | 6.7 | bal. | 1930 | 1200 | 900 | 1000 | 1.3 | A |
| 7 | 54.4 | 6.7 | bal. | 1930 | 2400 | 300 | 1000 | 8.0 | A |
| 8* | 54.4 | 6.7 | bal. | 1930 | 3600 | 300 | 1000 | 12.0 | A |
| 9 | 54.0 | 6.3 | bal. | 1930 | 1200 | 300 | 1000 | 4.0 | A |
| 10 | 54.4 | 7.0 | bal. | 1930 | 1200 | 300 | 1000 | 4.0 | A |
| 11 | 54.4 | 6.7 | bal. | 1930 | 600 | 150 | 1000 | 4.0 | A |
| 12* | 54.4 | 6.7 | bal. | 1930 | 300 | 150 | 1000 | 2.0 | A |
| 13* | 54.4 | 6.7 | bal. | 1930 | 2400 | 300 | 1000 | 8.0 | B |
| 14* | 52.0 | 7.0 | bal. | 1930 | 1200 | 300 | 1000 | 4.0 | B |
| 15* | 58.0 | 7.0 | bal. | 1930 | 1200 | 300 | 1000 | 4.0 | B |

To have the crystal grain boundaries in an amorphous phase, it is preferable to quench the sintered ferrite from the sintering-keeping temperature. The temperature-lowering speed from the sintering temperature to 600° C. is preferably selected properly from a range of 150-500° C./hr depending on the composition, though variable depending on the amounts of the sub-components such as Ca, Si, etc.

The present invention will be explained in more detail referring to Examples below without intention of restricting the present invention thereto.

Example 1

Starting materials ($Fe_2O_3$, $Mn_3O_4$ and ZnO) for main components were wet-mixed, dried, and calcined at 900° C. for 2 hours. The calcined powder and starting materials ($Co_3O_4$, $SiO_2$, $CaCO_3$ and $Ta_2O_5$) for sub-components were charged into a ball mill, in which they were pulverized and mixed to an average particle size of 0.75-0.9 μm. The resultant mixture was mixed with polyvinyl alcohol as a binder, and granulated by a spray drier. The resultant granules were molded into a Each Sample was measured with respect to the following properties.

(1) Temperature Dependency of Power Loss Pcv

Using a B-H Analyzer (SY-8232) available from Iwatsu Electric Co., Ltd., a sinusoidal AC magnetic field was applied to each Sample under the conditions of 1 MHz and 25 mT, and under the conditions of 2 MHz and 25 mT, respectively, to measure power loss Pcv at each temperature of 0° C., 20° C., 40° C., 60° C., 80° C., 100° C., 120° C. and 140° C. to evaluate the temperature dependency of the power loss Pcv.

(2) Initial Permeability μi and Relative Loss Coefficient Tan δ/μi

Using HP-4284A available from Hewlett-Packard, the initial permeability μi and the relative loss coefficient tan δ/μi were measured at 100 kHz and 20° C.

(3) Volume Resistivity ρ

It was measured using Multimeter.

(4) Density Ds

It was measured by an Archimedes method.

(5) Average Crystal Grain Size

A surface of each Sample was etched with concentrated hydrochloric acid to take a scanning electron photomicrograph (magnification: 3000 times), and five straight lines each as long as 30 μm were drawn on the photomicrograph to measure crystal grain sizes on each straight line, which were averaged.

The measurement results of each property are shown in Table 2.

thickness of several nanometers in any Sample. Also, both the grain boundary triple point and the grain boundary contained Ta together with Ca and Si. FIG. 1 is a TEM photograph showing the structure of the grain boundary triple point and crystal grain boundary of Sample 10, within the range of the present invention. In the TEM photograph, 1 and 2 denote a main phase, and 3 denotes a grain boundary triple point. In the microstructure, crystal grains were surrounded by grain

TABLE 2

| Sample No. | 0° C. | 20° C. | 40° C. | 60° C. | 80° C. | 100° C. | 120° C. | 140° C. |
|---|---|---|---|---|---|---|---|---|
| Pcv (kW/m$^3$) at 1 MHz, 25 mT | | | | | | | | |
| 1 | 9 | 3 | 3 | 6 | 12 | 19 | 30 | 41 |
| 2 | 22 | 17 | 16 | 20 | 26 | 35 | 47 | 64 |
| 3 | 36 | 31 | 29 | 32 | 31 | 34 | 42 | 51 |
| 4 | 69 | 59 | 45 | 39 | 38 | —$^{(1)}$ | — | — |
| 5* | 689 | 665 | 644 | 639 | 641 | 651 | 673 | 703 |
| 6* | 685 | 656 | 642 | 639 | 638 | 650 | 675 | 706 |
| 7 | 32 | 25 | 25 | 29 | 38 | 46 | 60 | 79 |
| 8* | 65 | 61 | 73 | 63 | 78 | 116 | 139 | 177 |
| 9 | — | — | — | — | — | — | — | — |
| 10 | — | — | — | — | — | — | — | — |
| 11 | 39 | 37 | 25 | 24 | 25 | 30 | 43 | 54 |
| 12* | 129 | 119 | 122 | 129 | 140 | 189 | 198 | 237 |
| 13* | — | — | — | — | — | — | — | — |
| 14* | — | — | — | — | — | — | — | — |
| 15* | — | — | — | — | — | — | — | — |
| Pcv (kW/m$^3$) at 2 MHz, 25 mT | | | | | | | | |
| 1 | 66 | 49 | 48 | 64 | 101 | 160 | 263 | 418 |
| 2 | 82 | 79 | 78 | 100 | 131 | 179 | 250 | 360 |
| 3 | 123 | 106 | 105 | 115 | 126 | 142 | 191 | 253 |
| 4 | 220 | 191 | 145 | 139 | 149 | 224 | 291 | —$^{(1)}$ |
| 5* | 1832 | 1767 | 1719 | 1700 | 1715 | 1755 | 1848 | 1987 |
| 6* | 1884 | 1808 | 1769 | 1757 | 1760 | 1819 | 1915 | 2042 |
| 7 | 112 | 107 | 118 | 132 | 172 | 230 | 319 | 443 |
| 8* | 242 | 253 | 252 | 289 | 366 | 535 | 692 | 891 |
| 9 | 142 | 130 | 125 | 135 | 150 | 190 | 260 | — |
| 10 | 43 | 30 | 27 | 37 | 57 | 95 | 155 | 257 |
| 11 | 205 | 161 | 137 | 139 | 154 | 191 | 256 | 368 |
| 12* | 624 | 614 | 639 | 682 | 727 | 885 | 1005 | 1218 |
| 13* | 122 | 137 | 171 | 229 | 339 | 443 | 563 | 727 |
| 14* | 318 | 278 | 256 | 258 | 302 | 396 | 537 | 681 |
| 15* | 494 | 473 | 496 | 542 | 592 | 615 | 653 | 693 |

| Sample No. | μi | tan δ/μi (×10$^{-6}$) | ds (×10$^3$ kg/m$^3$) | ρ (Ω·m) | Average Crystal Grain Size (μm) |
|---|---|---|---|---|---|
| 1 | 1218 | 1.8 | 4.83 | 1.7 | 1.9 |
| 2 | 1008 | 2.3 | 4.94 | 2.9 | 2.2 |
| 3 | 695 | 2.7 | 4.92 | 3.5 | 2.5 |
| 4 | 748 | 3.0 | 4.95 | 2.9 | 2.9 |
| 5* | 635 | 10.9 | 4.96 | 0.7 | 7.0 |
| 6* | 645 | 10.7 | 4.96 | 0.6 | 10.1 |
| 7 | 1022 | 2.6 | 4.76 | 1.3 | 2.0 |
| 8* | 1002 | 3.9 | 4.76 | 0.4 | 3.6 |
| 9 | 1000 | 2.5 | 4.80 | 5.0 | 2.2 |
| 10 | 1005 | 1.6 | 4.95 | 2.9 | 2.3 |
| 11 | 850 | 2.8 | 4.94 | 1.9 | 2.5 |
| 12* | 655 | 4.8 | 4.89 | 0.7 | 2.8 |
| 13* | 1070 | 2.8 | 4.74 | 0.8 | 1.7 |
| 14* | 829 | 5.2 | 4.93 | 13.3 | 2.4 |
| 15* | 272 | 7.9 | 4.95 | 0.8 | 1.5 |

Note:
$^{(1)}$Not measured.

The observation of the grain boundary triple points of Samples 1-4, 7, 9-11 by a transmission electron microscope (TEM) confirmed that all of them were constituted by an amorphous phase. The crystal grain boundary layer had a boundary layers with a uniform thickness of about 2-3 nm. Sample 10 exhibited an extremely small power loss.

The TEM observation of Sample 13 containing small amounts of Ca and Si, outside the range of the present invention, found no clear grain boundary layers. Sample 12 had as low volume resistivity as 0.7 Ω·m, and a power loss much larger than 350 kW/m³ at all measurement temperatures between 0° C. and 140° C.

Samples 1-4, 7 and 9-11 within the range of the present invention had average crystal grain sizes of 1.9-2.9 μm. On the other hand, Sample 8 containing much Ca had an average crystal grain size of 3.2 μm. The larger grain size led to increase in eddy current loss, residual loss and power loss.

Samples 1-4, 7 and 9-11 within the range of the present invention had lower power loss in a temperature range of 0-120° C. than Samples 5, 6, 8 and 12-15 outside the range of the present invention, and particularly Samples 3 and 10 had as low power loss Pcv (at 2 MHz) as 253 kW/m³ and 257 kW/m³, respectively, even at 140° C. The reduced power loss, and the reduced temperature dependency of power loss Pcv in such a high-temperature region are suitable for electronic parts, for instance, those for automobiles, etc., which are exposed to various temperatures from low temperature to high temperatures. In other Samples within the range of the present invention, too, the temperature for providing the minimum power loss was within 20-100° C.

Under the measurement conditions of a frequency of 1 MHz and a magnetic flux density of 25 mT, the Mn—Zn ferrites within the range of the present invention had lower power loss than those outside the range of the present invention in a wide temperature range. Also, the Mn—Zn ferrites within the range of the present invention had a saturation magnetic flux density of more than 400 mT at 100° C. The saturated magnetic density, residual magnetic flux density and coercivity of Sample 9 as an example are shown in Table 3. As is clear from Table 3, because the Mn—Zn ferrite of the present invention has a high saturation magnetic flux density even at high temperatures, it is not magnetically saturated even in a high-temperature environment, so that it exhibits excellent DC bias characteristics when used for a choke coil.

TABLE 3

| Sample | Saturated Magnetic Flux Density (mT) | | | Residual Magnetic Flux Density (mT) | | Coercivity (A/m) | |
|---|---|---|---|---|---|---|---|
| No. | 20° C. | 100° C. | 120° C. | 20° C. | 100° C. | 20° C. | 100° C. |
| 9 | 535 | 440 | 410 | 340 | 240 | 80 | 60 |

Example 2

Toroidal cores of the Mn—Zn ferrites having the compositions shown in Table 4 were produced in the same manner as in Example 1. Sintering was conducted according to the pattern A.

TABLE 4

| | Main Components | | | Sub-Components (ppm) | | | | | |
|---|---|---|---|---|---|---|---|---|---|
| Sample | (% by mol) | | | | | | | | CaCO₃/ |
| No. | Fe₂O₃ | ZnO | Mn₃O₄ | Co₃O₄ | CaCO₃ | SiO₂ | Ta₂O₅ | V₂O₅ | SiO₂ |
| 16 | 53.0 | 6.9 | bal. | 1900 | 1200 | 50 | 1000 | 200 | 24 |
| 17 | 54.6 | 1.9 | bal. | 3000 | 1200 | 50 | 1000 | 150 | 24 |
| 18 | 54.8 | 1.9 | bal. | 3500 | 1200 | 50 | 1000 | 150 | 24 |
| 19 | 54.8 | 1.9 | bal. | 4000 | 1200 | 50 | 1000 | 150 | 24 |
| 20 | 54.8 | 1.9 | bal. | 4500 | 1200 | 50 | 1000 | 150 | 24 |
| 21 | 54.8 | 1.9 | bal. | 5000 | 1200 | 50 | 1000 | 150 | 24 |
| 22 | 54.8 | 2.9 | bal. | 2000 | 1200 | 50 | 1000 | 150 | 24 |
| 23 | 54.5 | 2.9 | bal. | 3000 | 1200 | 50 | 1000 | 150 | 24 |
| 24 | 54.5 | 2.9 | bal. | 3500 | 1200 | 50 | 1000 | 150 | 24 |
| 25 | 54.8 | 2.9 | bal. | 2500 | 1200 | 50 | 1000 | 150 | 24 |
| 26 | 54.8 | 2.9 | bal. | 4000 | 1200 | 50 | 1000 | 150 | 24 |
| 27 | 54.8 | 2.9 | bal. | 4500 | 1200 | 50 | 1000 | 150 | 24 |
| 28 | 54.8 | 2.9 | bal. | 5000 | 1200 | 50 | 1000 | 150 | 24 |

The power loss Pcv, initial permeability μi, loss coefficient tan δ/μi, density ds, volume resistivity ρ and average crystal grain size of each Sample were measured by the same methods as in Example 1. The measurement conditions of power loss Pcv were 1 MHz and 50 mT, and 2 MHz and 50 mT, respectively, and its measurement temperatures were 20° C., 60° C., 80° C., 100° C. and 120° C. The measurement results are shown in Table 5.

TABLE 5

| Sample No. | Pcv (kW/m³) at 1 MHz, 50 mT | | | | | Pcv (kW/m³) at 2 MHz, 50 mT | | | | |
|---|---|---|---|---|---|---|---|---|---|---|
| | 20° C. | 60° C. | 80° C. | 100° C. | 120° C. | 20° C. | 60° C. | 80° C. | 100° C. | 120° C. |
| 16 | 206 | 161 | 200 | 259 | 359 | 837 | 727 | 1095 | 1626 | 2474 |
| 17 | 363 | 254 | 194 | 198 | 221 | 980 | 766 | 640 | 684 | 841 |
| 18 | 155 | 153 | 132 | 152 | 173 | 440 | 424 | 438 | 515 | 640 |
| 19 | 90 | 96 | 114 | 119 | 148 | 226 | 281 | 359 | 427 | 534 |
| 20 | 62 | 80 | 103 | 118 | 153 | 181 | 234 | 338 | 401 | 517 |
| 21 | 67 | 79 | 102 | 116 | 157 | 158 | 243 | 341 | 425 | 562 |
| 22 | 378 | 220 | 158 | 165 | 194 | 1154 | 762 | 610 | 680 | 898 |
| 23 | 305 | 238 | 188 | 186 | 220 | 840 | 693 | 635 | 690 | 848 |
| 24 | 214 | 195 | 165 | 177 | 199 | 636 | 593 | 575 | 857 | 785 |
| 25 | 342 | 249 | 182 | 185 | 217 | 911 | 701 | 609 | 671 | 871 |
| 26 | 74 | 85 | 105 | 127 | 159 | 189 | 261 | 357 | 431 | 574 |
| 27 | 68 | 108 | 101 | 118 | 164 | 197 | 269 | 360 | 435 | 537 |
| 28 | 78 | 82 | 129 | 125 | 158 | 218 | 242 | 369 | 439 | 572 |

| Sample No. | μi | tan δ/μi (×10⁻⁶) | Ds (×10³ kg/m³) | Volume Resistivity ρ (Ω·m) | Average Crystal Grain Size (μm) |
|---|---|---|---|---|---|
| 16 | 968 | 2.0 | 4.81 | 3.1 | 1.1 |
| 17 | 552 | 2.9 | 4.88 | 4.6 | 2.3 |
| 18 | 519 | 3.5 | 4.89 | 4.8 | 2.6 |
| 19 | 479 | 2.0 | 4.85 | 4.0 | 2.5 |
| 20 | 429 | 1.8 | 4.85 | 4.3 | 2.3 |
| 21 | 438 | 1.7 | 4.85 | 4.6 | 2.2 |
| 22 | 675 | 2.9 | 4.87 | 4.7 | 2.5 |
| 23 | 637 | 5.0 | 4.89 | 4.9 | 2.4 |
| 24 | 616 | 2.6 | 4.88 | 5.0 | 2.4 |
| 25 | 624 | 3.1 | 4.89 | 4.8 | 2.3 |
| 26 | 486 | 2.9 | 4.88 | 5.0 | 2.2 |
| 27 | 484 | 2.7 | 4.88 | 4.6 | 2.8 |
| 28 | 460 | 2.8 | 4.87 | 4.4 | 2.5 |

The TEM observation of the grain boundary triple points of each Sample confirmed that all of them were constituted by an amorphous phase. In any Sample, the grain boundary layers were as thick as several nanometers. Also, the grain boundary triple points and the grain boundary layers contained Ta and V together with Ca and Si. The volume resistivity ρ of each Sample was 1 Ω·m or more. Samples 17-28 containing 2000-5000 ppm (calculated as $Co_3O_4$) of Co per the main components (Fe, Mn and Zn) had as extremely low power loss Pcv as 1500 kW/m³ or less in a temperature range of 20-120° C. at a frequency of 2 MHz and a magnetic flux density of 50 mT. They also exhibited sufficiently low power loss even under the conditions of a frequency of 1 MHz and a magnetic flux density of 50 mT.

The average crystal grain size was 2.4-2.8 μm in the Mn—Zn ferrites of Samples 17-28. On the other hand, Sample 16 containing less than 54.0% by mol of $Fe_2O_3$ had a large power loss at a frequency of 2 MHz and a magnetic flux density of 50 mT in a temperature range of 20° C.-120° C., particularly the power loss Pcv 100° C. or higher being more than 1500 kW/m³, with an average crystal grain size of 1.1 μm.

To achieve low loss, it is necessary to secure that the domain walls move more as an applied magnetic field increases. From this aspect, the average crystal grain size should not be too small. On the other hand, if the average crystal grain size were too large, the power loss at a frequency of 2 MHz and a magnetic flux density of 25 mT would not be sufficiently low. Accordingly, the average crystal grain size is preferably 1.0-3 μm, more preferably 1.2-3 μm.

Example 3

Toroidal cores of the Mn—Zn ferrites having the compositions shown in Table 6 were produced in the same manner as in Example 1. Sintering was conducted according to the pattern A.

TABLE 6

| Sample No. | Main Components (% by mol) | | | Sub-Components (ppm) | | | | | CaCO₃/SiO₂ |
|---|---|---|---|---|---|---|---|---|---|
| | Fe₂O₃ | ZnO | Mn₃O₄ | Co₃O₄ | CaCO₃ | SiO₂ | Ta₂O₅ | V₂O₅ | |
| 29 | 53.7 | 7.0 | bal. | 1900 | 1200 | 50 | 1000 | 100 | 24 |
| 30 | 54.3 | 7.0 | bal. | 1900 | 1200 | 50 | 1000 | 100 | 24 |
| 31 | 54.6 | 7.0 | bal. | 1900 | 1200 | 50 | 1000 | 100 | 24 |
| 32 | 54.4 | 7.0 | bal. | 1000 | 1200 | 50 | 1000 | 100 | 24 |
| 33 | 54.4 | 7.0 | bal. | 1500 | 1200 | 50 | 1000 | 100 | 24 |
| 34 | 54.4 | 7.0 | bal. | 2500 | 1200 | 50 | 1000 | 100 | 24 |
| 35 | 54.4 | 7.0 | bal. | 3000 | 1200 | 50 | 1000 | 100 | 24 |

The power loss Pcv, initial permeability μi, loss coefficient tan δ/μi, density ds, volume resistivity ρ and average crystal grain size of each Sample were measured by the same methods as in Example 2. The measurement conditions of the power loss Pcv were 1 MHz and 50 mT, and 2 MHz and 50 mT, respectively, at measurement temperatures of 20° C., 40° C., 60° C., 80° C., 100° C. and 120° C. The measurement results are shown in Table 7.

TABLE 7

| Sample No. | Pcv (kW/m³) at 1 MHz, 50 mT | | | | | | Pcv (kW/m³) at 2 MHz, 50 mT | | | | | |
|---|---|---|---|---|---|---|---|---|---|---|---|---|
| | 20° C. | 40° C. | 60° C. | 80° C. | 100° C. | 120° C. | 20° C. | 40° C. | 60° C. | 80° C. | 100° C. | 120° C. |
| 29 | 316 | 261 | 221 | 190 | 184 | 215 | 1290 | 1246 | 1274 | 1360 | 1565 | 1992 |
| 30 | 217 | 193 | 157 | 146 | 156 | 191 | 784 | 747 | 724 | 748 | 903 | 1378 |
| 31 | 199 | 164 | 138 | 132 | 146 | 187 | 715 | 641 | 618 | 647 | 834 | 1282 |
| 32 | 260 | 203 | 167 | 152 | 166 | 212 | 955 | 885 | 850 | 908 | 1116 | 1702 |
| 33 | 201 | 157 | 131 | 122 | 138 | 179 | 725 | 643 | 585 | 621 | 810 | 1220 |
| 34 | 157 | 131 | 117 | 144 | 248 | 204 | 502 | 469 | 452 | 628 | 849 | 1156 |
| 35 | 103 | 97 | 103 | 103 | 120 | 146 | 346 | 335 | 386 | 394 | 550 | 885 |

| Sample No. | μi | tan δ/μi (×10⁻⁶) | ds (×10³ kg/m³) | Volume Resistivity ρ (Ω·m) | Average Crystal Grain Size (μm) |
|---|---|---|---|---|---|
| 29 | 1100 | 2.9 | 4.91 | 5.0 | 1.1 |
| 30 | 990 | 2.7 | 4.86 | 4.2 | 1.2 |
| 31 | 900 | 2.5 | 4.92 | 2.8 | 1.3 |
| 32 | 1030 | 3.1 | 4.90 | 4.1 | 1.2 |
| 33 | 1000 | 2.9 | 4.90 | 4.0 | 1.3 |
| 34 | 940 | 2.5 | 4.99 | 3.8 | 1.3 |
| 35 | 910 | 2.3 | 4.87 | 4.0 | 1.3 |

It was confirmed that grain boundary triple points were constituted by an amorphous phase in any Sample. Also, the grain boundary layers were as thick as several nanometers in any Sample. The grain boundaries and their triple points of any Samples contained Ta and V together with Ca and Si.

Each Sample had a resistivity of 1 Ω·m or more, a loss coefficient tan δ/μi of $5.0 \times 10^{-6}$ or less, a density ds of $4.80 \times 10^3$ kg/m³ or more, and an average crystal grain size of 1.4-1.6 μm except for Sample 24. The power loss at 1 MHz and 50 mT was less than 350 kW/m³ at all temperatures between 20° C. and 120° C. Sample 29 containing less than 54.0% by mol of Fe₂O₃ had a large power loss at a frequency of 2 MHz and a magnetic flux density of 50 mT in a temperature range of 20° C.-120° C., particularly the power loss Pcv being more than 1500 kW/m³ at 100° C. or higher. Sample 29 had an average crystal grain size of 1.1 μm.

Example 4

Toroidal cores of the Mn—Zn ferrites having the compositions shown in Table 8 were produced in the same manner as in Example 1. Sintering was conducted according to the pattern A.

TABLE 8

| Sample No. | Main Components (% by mol) | | | Sub-Components (ppm) | | | | | | CaCO$_3$/ SiO$_2$ |
|---|---|---|---|---|---|---|---|---|---|---|
| | Fe$_2$O$_3$ | ZnO | Mn$_3$O$_4$ | Co$_3$O$_4$ | CaCO$_3$ | SiO$_2$ | Ta$_2$O$_5$ | V$_2$O$_5$ | ZrO$_2$ | |
| *36 | 54.4 | 7.0 | bal. | 1900 | 1200 | 50 | 0 | 100 | 0 | 24 |
| 37 | 54.4 | 7.0 | bal. | 1900 | 1200 | 50 | 1000 | 100 | 400 | 24 |
| 38 | 54.4 | 7.0 | bal. | 1900 | 1200 | 50 | 1000 | 100 | 1400 | 24 |
| 39 | 54.4 | 7.0 | bal. | 1900 | 1200 | 50 | 600 | 100 | 0 | 24 |
| 40 | 54.4 | 7.0 | bal. | 1900 | 1200 | 50 | 800 | 100 | 0 | 24 |
| 41 | 54.4 | 7.0 | bal. | 1900 | 1200 | 50 | 1400 | 100 | 0 | 24 |
| 42 | 54.4 | 7.0 | bal. | 1900 | 1200 | 50 | 1800 | 100 | 0 | 24 |

Note:
"*" attached to the sample number indicates that it is a sample outside the range of the present invention.

The power loss Pcv, initial permeability μi, loss coefficient tan δ/μi, density ds, volume resistivity ρ and average crystal grain size of each of the resultant Samples were measured by the same methods as in Example 1. The measurement conditions of the power loss Pcv were 2 MHz, 50 mT and a temperature of 100° C. The measurement results are shown in Table 9.

TABLE 9

| Sample No. | μi | tan δ/μi (×10$^{-6}$) | ds (×10$^3$ kg/m$^3$) | Volume Resistivity ρ (Ω·m) | Average Crystal Grain Size (μm) | Pcv (kW/m$^3$) |
|---|---|---|---|---|---|---|
| *36 | 1130 | 5.1 | 4.91 | 1.8 | 2.0 | 1790 |
| 37 | 1030 | 2.9 | 4.92 | 3.9 | 1.6 | 1050 |
| 38 | 970 | 3.1 | 4.86 | 4.0 | 1.7 | 1390 |
| 39 | 1070 | 3.8 | 4.94 | 2.0 | 1.5 | 810 |
| 40 | 1010 | 2.9 | 4.92 | 3.1 | 1.5 | 620 |
| 41 | 100 | 3.0 | 4.90 | 4.4 | 1.2 | 730 |
| 42 | 980 | 3.1 | 4.91 | 5.3 | 1.2 | 820 |

Note:
"*" attached to the sample number indicates that it is a sample outside the range of the present invention.

It was confirmed that grain boundary triple points were constituted by an amorphous phase in any of Samples 32-37 within the range of the present invention. Also, any of Samples 32-37 had grain boundary layers as thick as several nanometers and contained Ta together with Ca and Si in grain boundaries and their triple points. Samples 37-42 had volume resistivity of 1 Ω·m or more, loss coefficients tan δ/μi of 5.0×10$^{-6}$ or less, densities ds of 4.8×10$^3$ kg/m$^3$ or more, and average crystal grain sizes of 1.2-1.7 μm. The power loss at 2 MHz, 50 mT and 100° C. was 1500 kW/m$^3$ or less in any of Samples 37-42. The power loss at 2 MHz, 50 mT and 100° C. was much larger than 1500 kW/m$^3$ in Sample 36 containing no Ta$_2$O$_5$.

Example 5

Figure 2:
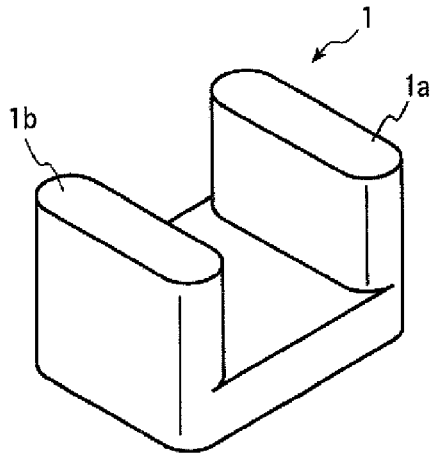
FIG. 2 is a perspective view showing a U-shaped magnetic core made of the Mn—Zn ferrite according to one embodiment of the present invention.
Figure 3:
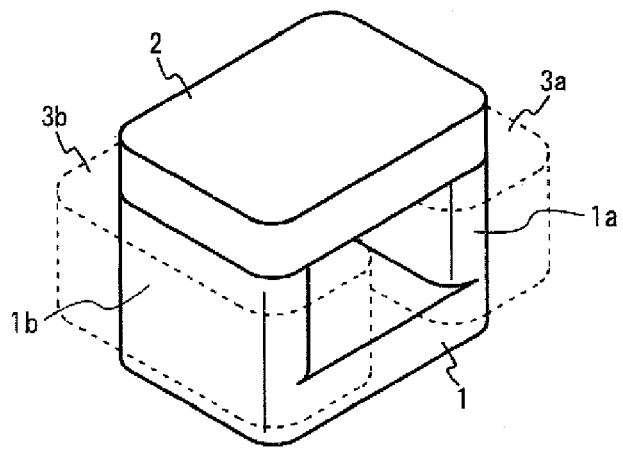
FIG. 3 is a perspective view showing a transformer comprising a combination of a U-shaped magnetic core made of the Mn—Zn ferrite according to one embodiment of the present invention, around which a coil is wound, and an I-shaped magnetic core.
Figure 4:
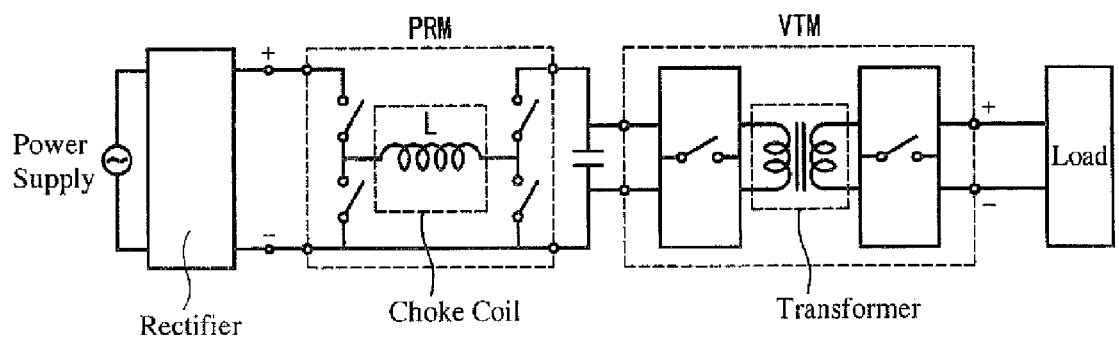
FIG. 4 is a block diagram showing a DC-DC converter circuit comprising the transformer shown in FIG. 3.

FIG. 2 shows a U-shaped core 1 having an outer size of 3.8 mm in width, 5.0 mm in length and 4.5 mm in height, which was made of the Mn—Zn ferrite of the present invention. With a primary coil 3a and a secondary coil 3b wound around two legs 1a, 1b of the U-shaped core 1, an I-shaped core 2 was abutted to the legs 1a, 1b to constitute the transformer shown in FIG. 3. This transformer was used in a voltage transformation module (VTM) for conducting insulation to a load and voltage transformation in the DC-DC converter shown in FIG. 4. As a result, the efficiency of the DC-DC converter was extremely improved.

EFFECT OF THE INVENTION

The low-loss Mn—Zn ferrite of the present invention having a low power loss and a high saturation magnetic flux density at as high a frequency as 1 MHz or more, particularly 2 MHz, in a wide temperature range and a wide operation magnetic flux density is suitable for magnetic cores of electronic parts such as transformers, choke coils, etc., and switching power supplies comprising electronic parts having such Mn—Zn ferrite magnetic cores have high operation efficiency, resulting in the reduction of the size and power consumption of electronic appliances to which the switching power supplies are mounted.

What is claimed is:

1. A low-loss Mn—Zn ferrite comprising Fe, Mn and Zn as main components, Co, Ca and Si as first sub-components, and at least one of Va-group metals as a second sub-component, Ta being indispensable; Fe and Zn being 53-56% by mol (calculated as Fe$_2$O$_3$) and 1-9% by mol (calculated as ZnO), respectively, and Mn being the balance (calculated as Mn$_3$O$_4$), based on the total amount (100% by mol) of said main components; Co and Ca being 500-5000 ppm (calculated as CO$_3$O$_4$) and 3000 ppm or less (calculated as CaCO$_3$), respectively, by mass based on the total amount of said main components, a mass ratio of Ca (calculated as CaCO$_3$) to Si (calculated as SiO$_2$) being 2 or more; Ta being 250 ppm or more (calculated as Ta$_2$O$_5$); said ferrite having an average crystal grain size of less than 3.2 μm and volume resistivity ρ of 1 Ω·m or more, and a power loss Pcv of 350 kW/m$^3$ or less in a range of 0° C.-120° C. at a frequency of 2 MHz and a magnetic flux density of 25 mT.

2. The low-loss Mn—Zn ferrite according to claim 1, wherein said Va-group metal is at least one selected from the group consisting of Ta, Nb and V, the total amount of said Va-group metals being 250-2000 ppm by mass (calculated as $Ta_2O_5$, $Nb_2O_5$ and $V_2O_5$) based on the total amount of said main components, wherein at least Ta must be present in an amount of 250 ppm or more (calculated as $Ta_2O_5$).

3. The low-loss Mn—Zn ferrite according to claim 1, further comprising at least one selected from the group consisting of Zr, Hf, Sn and Ti as a third sub-component; Zr being 1500 ppm or less (calculated as $ZrO_2$), Hf being 1500 ppm or less (calculated as $HfO_2$), Sn being 10000 ppm or less (calculated as $SnO_2$), and Ti being 10000 ppm or less (calculated as $TiO_2$), respectively, by mass based on the total amount of said main components.

4. The low-loss Mn—Zn ferrite according to claim 1, wherein said ferrite has an initial permeability μi of 400 or more at 100 kHz and 20° C., and a saturation magnetic flux density Bm of 400 mT or more at 100° C.

5. The low-loss Mn—Zn ferrite according to claim 1, wherein said main components comprise 54-55% by mol (calculated as $Fe_2O_3$) of Fe, and 1.5-7% by mol (calculated as ZnO) of Zn, the balance being Mn; wherein Co, Ca and Ta are 1000-5000 ppm (calculated as $Co_3O_4$), 500-3000 ppm (calculated as $CaCO_3$) and 500-2000 ppm (calculated as $Ta_2O_5$), respectively, by mass based on the total amount of said main components; and wherein said ferrite has a power loss Pcv of 1500 $kW/m^3$ or less in a range of 20° C.-120° C. at a frequency of 2 MHz and a magnetic flux density of 50 mT.

6. The low-loss Mn—Zn ferrite according to claim 1, wherein Si and Ca are 40 ppm or more (calculated as $SiO_2$) and 500-3000 ppm (calculated as $CaCO_3$), respectively, the total amount of $SiO_2$ and $CaCO_3$ being 750 ppm or more, respectively, by mass based on the total amount of said main components by mass.

7. The low-loss Mn—Zn ferrite according to claim 1, whose grain boundary layer contains Si and Ca, and further an oxide of at least one Va-group metal.

8. The low-loss Mn—Zn ferrite according to claim 3, wherein Ca and at least one of Zr, Hf, Sn and Ti are dissolved in crystal grains.

9. The low-loss Mn—Zn ferrite according to claim 1, wherein said average crystal grain size is 1.2-3 μm.

10. An electronic part comprising a magnetic core made of the low-loss Mn—Zn ferrite recited in claim 1, around which a coil is wound.

11. A switching power supply comprising the electronic parts recited in claim 10 as a transformer and/or a choke coil.

* * * * *